United States Patent [19]

Scott

[11] Patent Number: 5,528,863

[45] Date of Patent: Jun. 25, 1996

[54] POLYMERIC SEALING/SPRING STRIP AND EXTRUSION METHOD OF PRODUCING SAME

[75] Inventor: Michael K. Scott, Hilliard, Ohio

[73] Assignee: Crane Plastics Company Limited Partnership, Columbus, Ohio

[21] Appl. No.: 506,728

[22] Filed: Jul. 26, 1995

Related U.S. Application Data

[62] Division of Ser. No. 313,419, Sep. 27, 1994, abandoned, which is a division of Ser. No. 7,187, Jan. 21, 1993, Pat. No. 5,375,376.

[51] Int. Cl.$^6$ ..................................................... E06B 7/215
[52] U.S. Cl. ..................... 49/480.1; 49/475.1; 49/484.1; 49/489.1; 49/495.1
[58] Field of Search ................................ 49/475.1, 489.1, 49/480.1, 484.1, 495.1, 496.1, 414, 419

[56] References Cited

U.S. PATENT DOCUMENTS 3,535,824 10/1970 Kessler ...................... 49/489.1 X
4,442,156 4/1984 Yamaguchi ...................... 49/475.1 X

FOREIGN PATENT DOCUMENTS 2523664 12/1976 Germany ...................... 49/475.1
633072 11/1982 Switzerland ...................... 49/489.1

Primary Examiner—Philip C. Kannan
Attorney, Agent, or Firm—Standley & Gilcrest

[57] ABSTRACT

A polymeric sealing/spring strip and method of producing same. The polymeric sealing/spring strip of the present invention has several various embodiments which are based upon the incorporation of silicone rubber, Some of the embodiments are based on the formation of a resilient silicone rubber surface to provide a sealing/spring contact with an opposing surface. Other embodiments of the invention incorporate the silicone rubber in such way as to utilize its resilient properties to produce a sealing/spring strip which has improved mechanical resilience properties.

The method of the present invention allows the production of a sealing/spring strip in accordance with the present invention by using extrusion techniques.

6 Claims, 5 Drawing Sheets

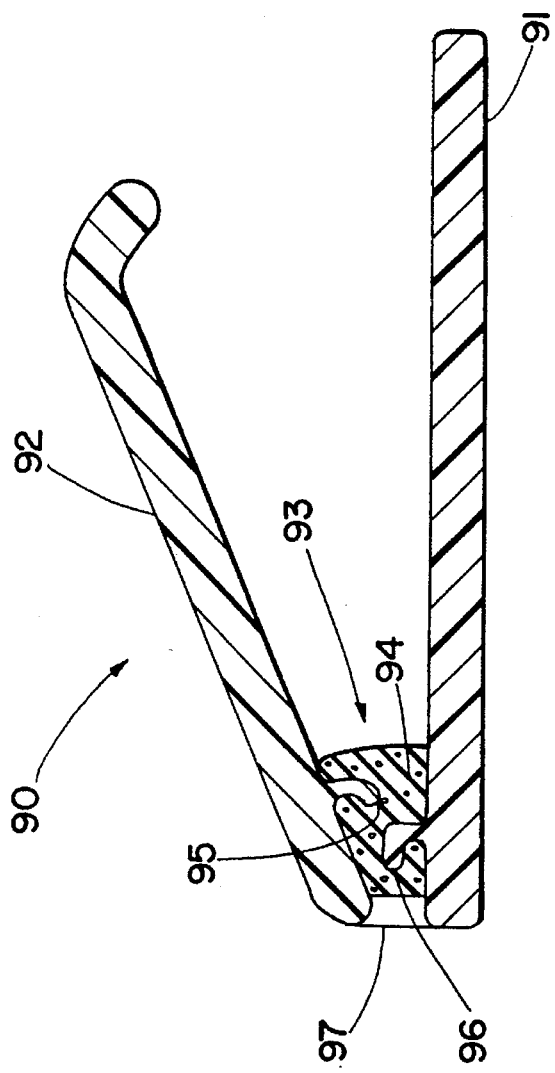
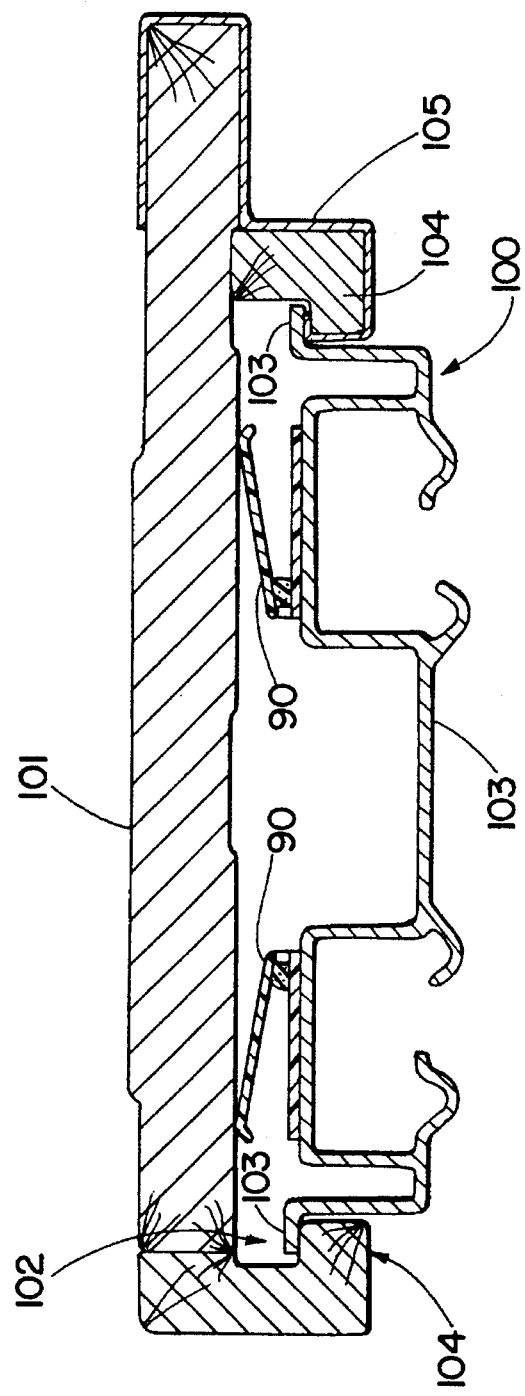

POLYMERIC SEALING/SPRING STRIP AND EXTRUSION METHOD OF PRODUCING SAME

This is a divisional application of U.S. patent application Ser. No. 08/313,419 filed Sep. 27, 1994 which is a divisional application of U.S. patent application Ser. No. 08/007,187 filed Jan. 21, 1993, now U.S. Pat. No. 5,375,376 issued Dec. 27, 1994, entitled POLYMERIC SEALING/SPRING STRIP AND EXTRUSION METHOD OF PRODUCING SAME.

TECHNICAL FIELD

The present invention pertains to a polymeric sealing/spring strip and method of producing same. The polymeric sealing/spring strip of the present invention has several various embodiments which are based upon the incorporation of silicone rubber. Some of the embodiments are based on the formation of a resilient silicone rubber surface to provide a sealing/spring contact with an opposing surface period. Other embodiments of the invention incorporate the silicone rubber in such way as to utilize its resilient properties to produce a sealing/spring strip which has improved mechanical resilience properties.

The method of the present invention allows the production of a sealing/spring strip in accordance with the present invention by using extrusion techniques.

BACKGROUND

There are a wide variety of sealing strips known and used in the prior art. Such sealing strips may be used in many applications such as for weather stripping, insulated doors and windows, such as those found in buildings and on appliances, and in various other applications where a seal between two adjacent surfaces (moveable or immoveable) is desired.

In applications where a seal is desired between two surfaces held in place, it is desirable that a sealing strip maintain a good seal which is uniform throughout the length of the sealing strip. It is also desirable that the strip be resistant to adverse environmental conditions such as heat, water and sun light to which the sealing strip may be exposed, and maintain a seal and notwithstanding such conditions. Known sealing strip materials such as foamed urethane degrade over time when exposed to such environmental conditions.

To do this, it is desirable to provide a flexible and degradation-resistant surface which possess a degree of resilience which is capable of providing a consistent static of force against an opposing surface.

It is also desirable to provide a sealing strip of materials which have heat insulative qualities.

In the instances where a sealing strip is to be applied between two surfaces moveable with respect to one another, it is also important that a sealing strip be adapted to facilitate the movement of such surfaces. It is also desirable that the sealing strip possess overall resilience properties which resist fatigue over several cycles of separating and realigning of the opposing surfaces to which the sealing strip is applied; such as in the case of the opening and closing of a door or a window.

One of the materials often used in insulative sealing is silicone rubber. Silicone rubber has very good resilience and resists the fatigue and environment degradation described above. However, one of the drawbacks to the use of silicone rubber is that it must be applied as a fluid and subsequently cured to form a dimensionally stable material. Because of its flow characteristics in the uncured state, silicone rubber is often difficult to apply in manufacturing processes, particularly in those processes which involve high speed production such as is the case in extrusion machinery set ups. Spillage is also a problem inherent to the use of a liquid material in extrusion production. Accordingly, it is difficult to incorporate a silicone rubber portion into an extrudate at rates at which extrudates are typically formed.

Accordingly, it would be desirable to be able to incorporate dimensionally stable silicone rubber portions into a sealing strip construction, particularly those constructions produced by the polymeric extrusion.

Another disadvantage of the use of silicone rubber is that it is generally a more expensive per unit volume than the industrial polymers typically used in the production of a sealing strip. Accordingly, it would be desirable to be able to incorporate silicone rubber into a sealing/spring strip to gain its advantages while minimizing the amount of silicone used in the sealing strip as a whole.

Another application for the present invention is in the field of spring-like devices, with or without reference to insulative or other environmental sealing. Such devices may find application in a wide variety of settings, such as in cabinetry where a spring-like device is used to urge the opening of doors as they are unlatched. Another potential application is in wall protection systems which are designed to absorb shock, such as those used in hospital interiors to protect walls from the impact of wheeled beds, carts, wheelchairs, etc. Many of the desirable properties discussed above are also important to this general area, such as resilience, fatigue resistance, integrity against environmental degradation. It is also desirable in such applications to minimize the amount of silicone rubber used.

In view of the present disclosure and/or the practice of the present invention and its many embodiments, other advantages or the solutions to other problems may become apparent to one of ordinary skill in the art.

SUMMARY OF THE INVENTION

The present invention generally relates to a polymeric sealing/spring strip incorporating silicone rubber, and a method of producing the same by extrusion or co-extrusion. The profiles of the polymeric extrudates used in the present invention can all be produced with conventional extrusion equipment, and with extrusion dies produced in accordance with methods known in the art.

The sealing/spring strip of the present invention has many different embodiments, each having features which may be preferred in different applications.

The first embodiment of the inventive sealing/spring strip comprises a longitudinally extending polymer and silicone rubber composite strip. The strip, in cross-section, comprises a base portion which has first and second sides. One side (e.g. the "first" side) is provided with a longitudinally extending well formed in the first side. The well is provided with a cured silicone rubber bead which fills the well to an extent that it extends from the well so that it provides a resilient surface of silicone rubber which extends from (or above) the first surface, i.e. in such a way that it will make contact with an opposing surface before the first surface will.

Rather than being formed in the first side itself, an alternative embodiment provides that the base portion of the cross-section may be provided with at least two extension portions which extend so as to form a well between them (i.e. substantially perpendicular to the base portion's first surface).

With respect to either the first embodiment or its alternative, an additional longitudinally sealing/spring number may be placed in the well so as to enclose a space which is rendered unavailable to filling by the silicone rubber. As can be appreciated particularly in light of the figures showing this embodiment, such excluded space allows the resulting silicone rubber surface to have the particular width and height above the base portion surface desired by the user, while minimizing the overall amount of silicone rubber used.

The above-described first embodiment types are exemplified by FIGS. 1, 2 and 6 discussed in more detail below.

In a second embodiment type, a sealing/spring strip in accordance with the present invention may be provided by forming a longitudinally extending polymeric strip whose cross-section comprises a base portion having first and second sides providing respective first and second surfaces. One of the sides (e.g. the "first" side) is provided with at least one "vaned extension portion" which extends from the first side and is adapted to support uncured silicone rubber and resist the spreading of the uncured silicone rubber over the respective first surface.

As used herein the term "vaned polymeric extension" refers to any extension with a series of one or more sides at angles so as to provide physical support for a bead of uncured silicone rubber, as well as to provide increased surface area so that the silicone rubber will resist spreading of virtue of mechanical resistance and increased surface tension.

The vaned extension in accordance with the present invention may take on almost any imaginable geometric shape functional for the intended purpose such as V-shapes, T-shapes and/or cross-shapes.

Examples of the second embodiment type of the present invention are shown in FIG. 3 below.

The advantages of the first two embodiment types of the present invention include the ability to provide additional structural support for a resilient surface of silicone rubber in a sealing/spring strip. These embodiments also allow the silicone rubber surface to extend substantially further from or above the first surface than if the silicone rubber were left unsupported prior to curing. This is especially important where such sealing/spring strips are produced in an extrusion process so that the silicone rubber can be applied and cured onto a freshly produced extrudate without spreading. This allows the desired height and resilience characteristics can be achieved.

A third embodiment type of the present invention is a sealing/spring strip which also comprises a longitudinally extending polymer and silicone rubber composite strip, the strip having a cross-section which comprises a base portion having first and second sides and at least one extension portion extending from one of such sides (e.g. the "first" side), at an acute angle to the surface of the first side. In this way, a longitudinally extending acute corner is formed between the extension(s) and the first surface.

The extension portion(s) is/are flexible with respect to the base portion, and is/are therefore moveable between a rest position relatively further from the base portion and a compressed position relatively closer to the base portion.

Cured silicone rubber is disposed in the acute angle corner, either in a broken or unbroken bead, whereby the cured silicone rubber resists the movement of the extension portion(s) from the rest position to the compressed position.

In this way, much more of the physical structure of the total sealant strip is provided by the polymeric material while a relatively small amount of the silicone rubber is strategically placed to take advantage of its resilience and non-fatigue qualities.

The acute angle corner also serves to hold the cured silicone rubber in place, particularly in an extrusion process where the polymeric strip is held in such a way so that the angle opens upwardly to allow the uncured silicone rubber to be placed in the V-shaped well formed thereby. This also permits the silicone or rubber to be maintained most deeply in the corner to provide the best resilient mechanical properties in the finished product.

It is preferred that the acute angle corner be formed by the coextrusion of polymers of differing physical characteristics to best perform the intended function. In this regard, the polymer used to form the major portion of the extension portion(s) and the base portion is preferably of a higher impact rating (i.e. lower flexibility) than that minor portion of the extension portion(s) used to hold the extension portion(s) at an acute angle to the base member. This allows the major portion of the extension portion(s) not to bend under a load while the minor corner section itself flexes. This construction helps to prevent the polymer in the extension portion(s) from fatiguing over several flexing cycles and from having a shape memory imparted to such portion(s).

Examples of a combination of polymeric materials which may be used for the base and major portion of the extension portion(s), and for the minor portion of the extension portion(s) (i.e. that holding the major portion of the extension portion(s) at an acute angle to the base portion(s)) are, respectively high impact PVC formulation 85857 and flexible PVC formulation 83741, both commercially available from B.F. Goodrich Chemicals of Akron, Ohio. One alternative of this embodiment is to provide two extension portions extending at opposing angles to the first surface. This embodiment may be desirable where more uniform static forces are desired once the opposing surfaces to be sealed by the sealing/spring strip are brought in close to proximity to move the extension portions toward the compressed position.

This embodiment may be produced by maintaining the base portion flat whereby the acute angle corner(s) will help to maintain the uncured silicone rubber bead in the corner. In a preferred embodiment, the extension portion(s) and/or the base portion is provided with small extensions which extended into the interior of the acute angle formed thereby, so as to assist in the retention of the silicone rubber bead in the acute angle corner, without affecting the movement of the extension portion between the rest and compressed positions.

The angle at which the extension portion(s) are held with respect to the base portion may be any acute angle, but will normally be considered in the range of 1 to 60 degrees depending on the desired application.

An example of this embodiment is shown in more detail in FIGS. 4, 8, 9 and 10 below.

A fourth embodiment of a sealing/spring strip in accordance the present invention compresses a longitudinally extending polymer and silicone rubber composite strip, these strips having a cross section which comprises a base portion having first and second sides which provide respective first and second surfaces. The base portion has a longitudinally extending well formed in one of its sides (e.g.

the "first" side). The cross section also comprises at least extension portion which is partially disposed inside the well and extends away from the first surface at an angle. The extension portion(s) is held resiliently in place by silicone rubber in the well so that the extension(s) is/are moveable from a rest position relatively further from the first surface, to a compressed position relatively closer to the first surface. The cured silicone rubber thereby resists the movement of the extension from the rest position to the compressed position.

The base portion and extension portion(s) may be extruded as individual portions. Alternatively, the base portion may be integrally incorporated into the balance of the structure to which the sealing/spring strip is to be applied.

In an alternative to the fourth embodiment, the sealing/spring strip may comprise two such extension portions extending at opposing angles from the first surface, such extension portions being held resiliently in place by the silicone rubber disposed in the well, and each moveable between a rest position and a compressed position.

The present invention also includes methods for preparing sealing/spring strips in accordance with any of the aforesaid embodiments.

In order to produce a sealing/spring strip in accordance with the above-described first, second, or third embodiments, a longitudinally extending polymeric strip of the appropriate profile is extruded or pultruded. As used herein, further reference to extrusion or extrudates shall be understood as also encompassing pultrusion and pultrudates, respectively.

The polymeric material(s) which may be used in the present invention include any thermoplastic or thermosetting polymeric material, such as those amenable to extrusion or pultrusion, for example, polyvinylchlorides, chloropolyvinylchlorides, fluoropolymers, and mixtures, composites and alloys thereof. Of these, high impact, weatherable PVC, such as B.F. Goodrich 85857 PVC, is preferred for all such constructions, except in the preferred embodiment of the third embodiment type discussed above where PVC of two different impact ratings (i.e. different flexibilities) are used.

In a preferred embodiment, the polymeric material(s) may be foamed to provide small gas spaces within the polymeric material(s). This not only increases the insulative value of the polymeric material(s), but reduces the volume of polymeric material(s) per linear foot of the coextrudate. The polymeric material(s) may be foamed using either azo-type or bicarbonate foaming agents, azo-type agents being preferred. The foaming agents are admixed with the polymeric material(s) in the extruder in accordance with known practice. Examples of appropriate azotype agents include Siligen®, Grade AZRV, commercially available from Uniroyal Chemical Company of Middlebury, Conn., and Grade No. HRVP01 from Hughes Industrial Corporation. The azotype foaming agents are used in a concentration range of from about 0.1 to about 1.0 parts per hundred (pph), preferably in the range of about 0.3 to 0.5 pph, with 0.3 pph being the most preferred value. An example of the bicarbonate type foaming agents include Hydrocerol®, commercially available from Boehringer Ingelheim, which is used in a concentration range on the order of those given above for the azo-type foaming agents.

The thickness of the polymeric material(s) (foamed or nonfoamed) is not critical, and typically are in the range of above about 10 mils, depending on the desired application. This can normally be determined by considering the prospective amount of load and/or stress to be imparted to the sealing/spring strip.

As an example, the Hughes Industrial Corporation Grade No. HRVP01 was used with a high impact, weatherable PVC, B.F. Goodrich 85857, at a concentration of about 0.3 pph. A Davis Standard 1.25 inch single screw extruder produced the extrudate at a rate of 6.5 ft/min using a barrel temperature of 345° F.

At a point in the extrusion/pultrusion line where the extrudate becomes sufficiently dimensionally stable to accept it, a bead of silicone rubber is supplied to the strip in the prescribed location.

With respect to the first embodiment, silicone rubber is placed in the well formed in the extruded polymeric strip at a rate sufficient to fill the well to an extent that is sufficient to produce a meniscus extending from the boundaries of the well. This can be readily determined by calculating the necessary volume of silicone rubber per length of the extrudate while also considering the speed at which the extrudate is produced so as to arrive at a flow rate for the silicone rubber. These parameters will of course vary with the well height, well depth and well geometry for each desired application.

As to the second embodiment, a longitudinally extending polymeric strip is extruded so as to have a profile forming at least one vaned polymeric extension adapted to support uncured silicone rubber and resist its spreading over the upper surface of the extrudate.

The uncured silicone rubber may placed on the vaned polymeric extension(s), such as in the form of a bead of silicone rubber which is laid on the vaned polymeric extension(s) as the extrudate emerges from the extruder. The silicone rubber is then cured in the normal manner and accordance with the methods known in the art at a subsequent point in the extruder line. It is preferred that the curing being initiated immediately after the uncured silicone rubber is placed on the extrudate in order that the initial shape of the uncured silicone rubber bead be maintained.

Turning to the third embodiment which involves the placement of uncured silicone rubber in the acute corner formed in extradite profile, this embodiment may be formed by extruding a polymeric strip of an appropriate profile to form such an acute angle corner as described above.

Where only one such extension is to be formed, it is preferred that the extrudate be oriented such that the acute angle corner opens upwardly. This allows the uncured silicone rubber to be placed in the acute angle corner so that it is maintained in the corner by gravity, much in the same way as is the case with respect to the well of the above-described first embodiment. The uncured silicone rubber may be disposed in the acute angle corner by running a bead of uncured silicone rubber into this portion of the extrudate after the appropriate profile is formed.

Curing of the silicone rubber bead follows downstream in the extruder line.

Where extensions of opposing acute angles are to be produced (as shown in FIG. 4), the base portion of the extrudate may be oriented horizontally and two beads of silicone rubber injected laterally into the opposing acute angle corners. Surface tension will generally hold the silicone rubber in place and it is preferred that the curing of the silicone rubber follow immediately after its injection in order that the silicone rubber be maintained well within the acute angle corners. Most preferred however is to provide that the profile have small extension portions that extend into the acute angle corner to prevent the uncured silicone rubber from flowing from its intended position.

In producing a sealing/spring strip in accordance with the fourth embodiment of the invention, the individual portions of the sealing/spring strip construction may be extruded in such a way as to maintain their orientation to form the polymer and silicone rubber composite. For example, a base portion is extruded which has a well formed into its upper side. Uncured silicone rubber is injected into the well and at least one longitudinally extending polymeric extension member is extruded in such a way that it extends into the uncured silicone rubber in the well and is oriented at an angle to the upper side of the base portion. Once the extension member(s) is/are in place, the silicone rubber is cured so as to maintain the extension member(s) in place so as to complete the formation of the polymer and silicone rubber composite strip.

The polymer and silicone rubber strips prepared in accordance with the present invention may be used in any of a wide variety of applications where the sealing and/or spring-like characteristics of the present invention are desired. The present invention is not limited to any particular use thereof.

The sealing/spring strips may be cut to size to fit any application, and it may be that very short lengths may suffice where only the spring-like properties are desired.

Strips in accordance with the present invention may be applied to, or incorporated into, the closure edges of doors, in window jambs and along the edges of other building members where there is a need to create a seal and/or spring means between two surfaces brought into close proximity.

The present invention may also be applied to surfaces in such a way as to take advantage of its spring-like properties. An example of such an application is along the edges of cabinet doors or the surfaces they abut, particularly in the use of doors which use a pressure-activated latch, so that the cabinet door is urged toward the open position once the latch is opened.

DESCRIPTION OF THE DRAWINGS

FIG. 9 is a cross-section view of a sealing/spring strip in accordance with a third embodiment type of the present invention.

FIG. 10 is a cross-section, environmental view of a jamb liner in a window frame, and incorporating a sealing/spring strip in accordance with a third embodiment type of the present invention in said jamb liner.

DETAILED DESCRIPTION OF THE PREFERRED EMBODIMENTS

The following is a detailed description of the preferred embodiments of the invention which are presently considered to be the best modes of the invention for a variety of applications.

Figure 1:
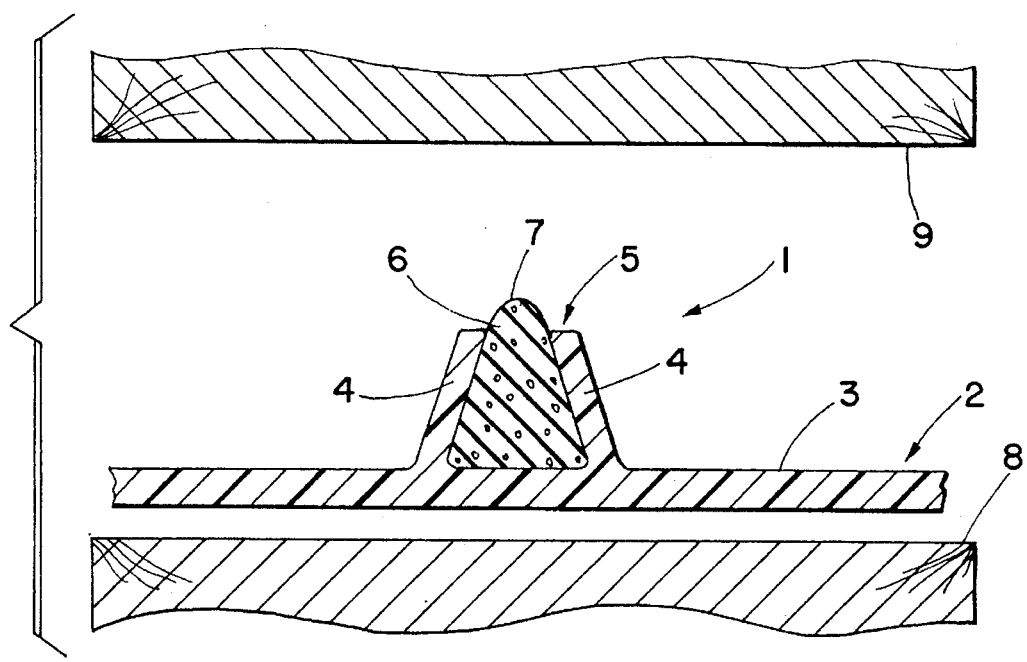
FIG. 1 is a cross-section view of the sealing/spring strip in accordance with the first embodiment type of the present invention.

FIG. 1 shows a cross-section view of a first embodiment type in accordance with the present invention. FIG. 1 shows sealing/spring strip 1 which comprises polymeric extrudate 2. Polymeric extrudate 2 has upper surface 3 from which extend extension portions 4 so as to form well 5. Well 5 is completely filled with silicone rubber 6 so as to expose a meniscus forming resilient surface 7 of silicone rubber. Sealing/spring strip 1 is employed by fixing it to a first surface 8 which, together with second surface 9 represent two surfaces between which a seal is desired. Once fixed to first surface 8, the sealing/spring strip may be urged against second surface 9 so that resilient surface 7 forms a seal against second surface 9.

Sealing/spring strip 1 may be affixed to first surface 8 by any well-known mechanical means such as through the use of nails, screws, bolts, adhesives or any other equivalent mechanical force. Alternatively and preferably, the sealing/spring strip 1 may be integrally incorporated into the balance of the structure represented by first surface 8 (such as in the form of an integral polymeric piece).

Figure 6:
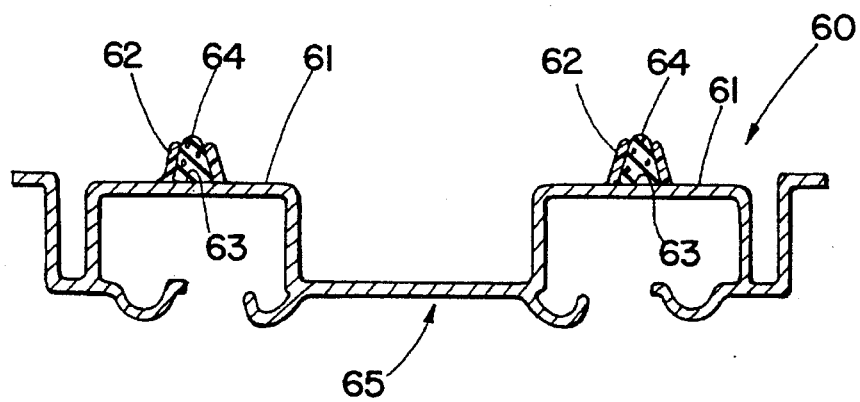
FIG. 6 is a cross-section view of a sealing/spring strip in accordance with a first embodiment type of the present invention, and featuring a profile adapting the strip for use in a dual pane window assembly.

FIG. 6 shows a cross-sections of a sealing/spring strip in accordance with a first embodiment type of the present invention, and featuring a profile adapting the strip for use in a dual pane window assembly. This embodiment shows that the base portion of the extrudate may be shaped to adapt to any particular application. In the case of FIG. 6, the profile of the extrudate is adapted to accept and maintain in position two glass panes in a dual pane thermal window assembly, in accordance with known geometries for such assemblies. Such assemblies may be manufactured in accordance with assembly and production practices known in the art. FIG. 6 shows base portion shows jamb liner 60 which incorporates base portions 61, each provided with extension portions 62, forming respective wells 63, and adapted to hold silicone rubber bead 64. The balance of the jamb liner structure 65 is formed so as to be amenable to its use as a jamb liner; that is, to engage a dual pane window assembly in accordance with profiles and arrangements known in the art as exemplified in FIG. 10 herein.

Figure 7:
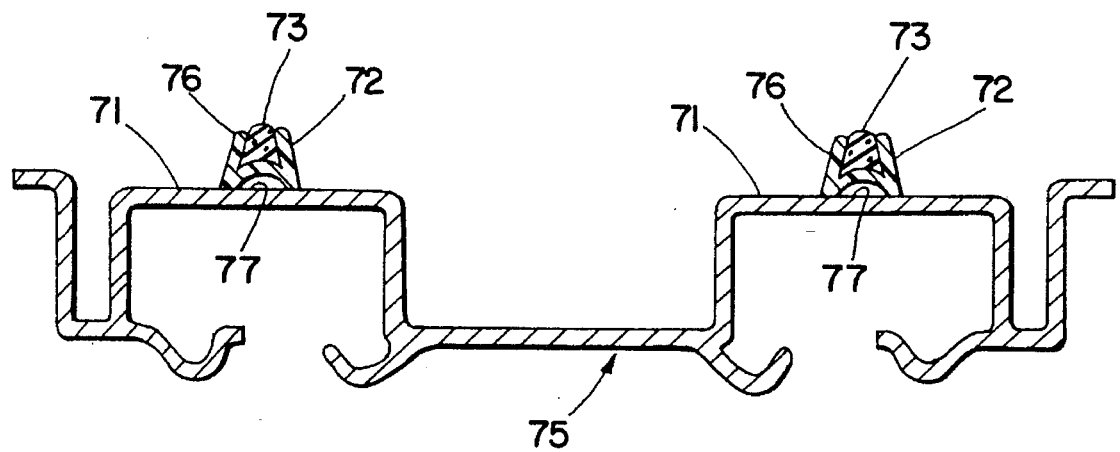
FIG. 7 is a cross-section view of the sealing/spring strip in accordance with an alternative embodiment of the first embodiment type of the present invention, and featuring a profile adapting the strip for use in a dual pane window assembly.

FIG. 7 is a cross-section view of the sealing/spring strip in accordance with an alternative embodiment of the first embodiment type of the present invention, and featuring a profile likewise adapting the strip for use in a dual pane window assembly. FIG. 7 shows base portion shows jamb liner 70 which incorporates base portions 71, each provided with extension portions 72, forming respective wells 73, and adapted to hold silicone rubber bead 74. Wells 73 also contain longitudinally extending spacer member 76 which creates space 77. The balance of the jamb liner structure 75 is formed so as to be amenable to its use as a jamb liner; that is, to engage a dual pane window assembly,in accordance with profiles and arrangements known in the art as exemplified in FIG. 10 herein.

Figure 2:
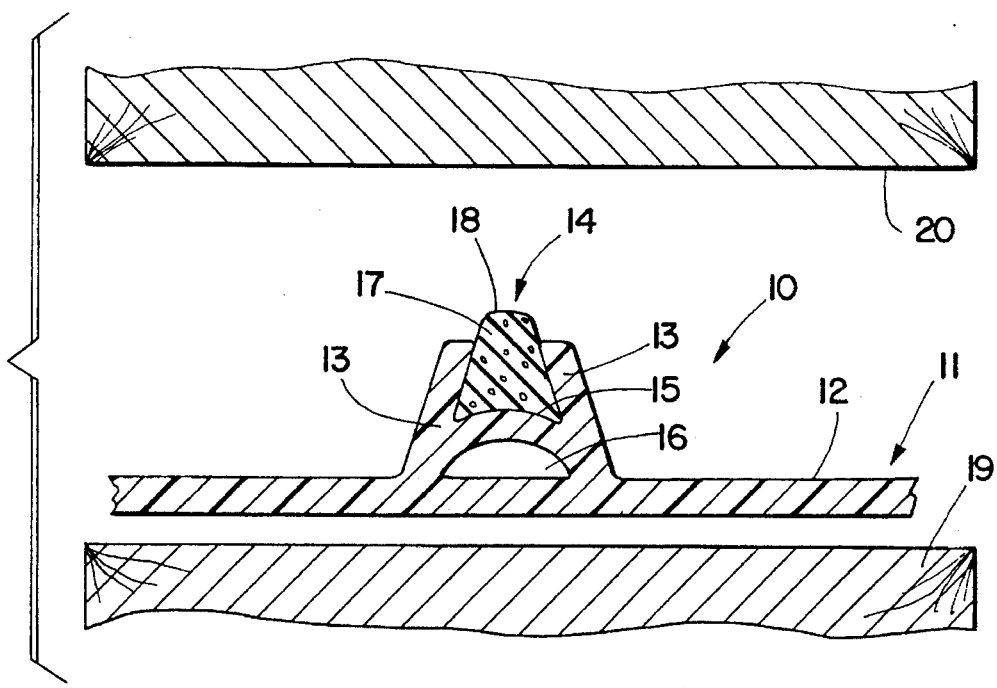
FIG. 2 is a cross-section view of the sealing/spring strip in accordance with an alternative embodiment of the first embodiment type of the present invention.

FIG. 2 shows an alternative embodiment of the first embodiment type of the present invention. FIG. 2 shows a sealing/spring strip 10 which is formed by a polymeric extrudate 11 having first surface 12. Extending from first surface 12 are extension portions 13 which form well 14. This embodiment also features a sealing portion 15 which serves to seal off excluded space 16. The balance of well 14 is then filled completely with silicone rubber 17 such that resilient surface 18 is exposed. This embodiment allows a reduction in the volume of silicone rubber needed in respective lengths of the sealing/spring strip. Also, this type of arrangement can be used to add additional strength to the overall sealing/spring strip construction.

Sealing/spring strip 10 can be employed in the same way as sealing/spring strip 1 of FIG. 1. The sealing/spring strip can be attached to a first surface 19 while the resilient surface 18 is urged against second surface 20 so as to form a seal between the two surfaces. Alternatively and preferably, the sealing/spring strip 10 may be integrally incorporated into the balance of the structure represented by first surface 19 (such as in the form of an integral polymeric piece).

Figure 3:
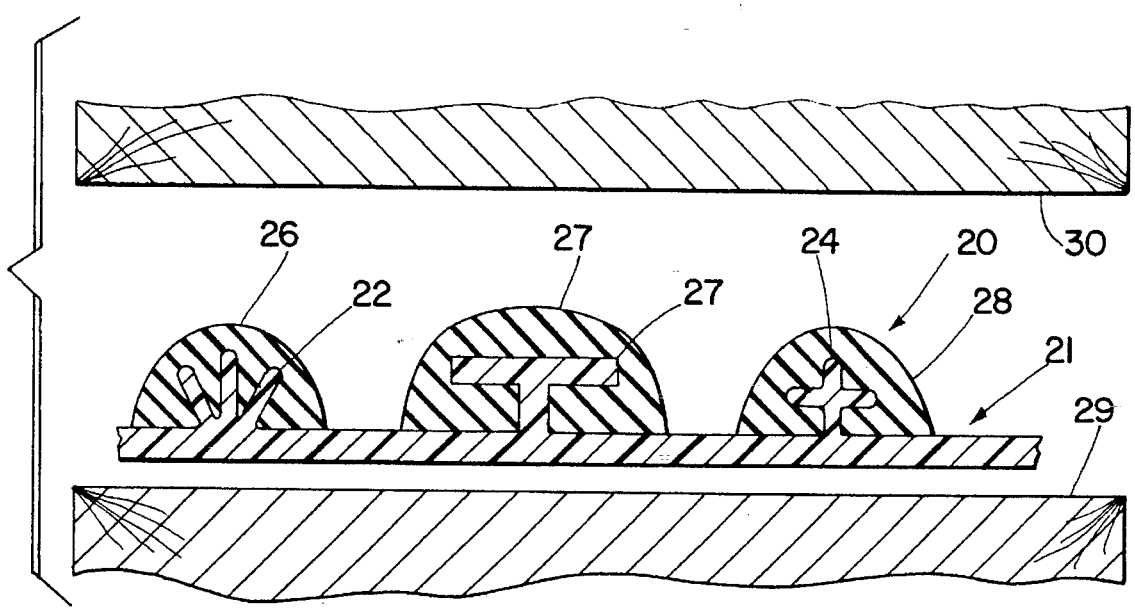
FIG. 3 is a cross-section view of a sealing/spring strip showing three alternative embodiments of the third embodiment type of the present invention.

FIG. 3 shows three ways in which a sealing/spring strip in accordance with a second embodiment type of the present invention might be prepared. FIG. 3 shows a sealing/spring strip 20 which comprises polymeric extrudate 21. Polymeric extrudate 21 is shown as having three different types of vaned extension portions 22, 23, and 24 which are examples of the variety of ways vaned extension portions can be provided in a sealing/spring strip in accordance with this embodiment of the present invention. Vaned extension 22 is an example of a vaned extension comprising one or more V-shapes. Vaned extension 23 is a T-shaped extension, and vaned extension 24 is cross-shaped. It should be understood that a sealing/spring strip in accordance with this embodiment of the present invention may be formed using one or more than one such vaned extensions of the same or differing geometries. Each of the vaned extensions is shown as extending from upper surface 25.

Each vaned extension is provided with a bead of silicone rubber, shown as silicone rubber beads 26, 27 and 28 disposed respectively over vaned extensions 22, 23 and 24. A sealing/spring strip 20 may be used to form a seal between first surface 29 and second surface 30. This may be done by physically affixing polymeric extrudate 21 to first surface 29 so as to present the resilient surfaces of silicone rubber beads 26, 27 and 28 to second surface 30. Alternatively and preferably, the sealing/spring strip 20 may be integrally incorporated into the balance of the structure represented by first surface 29 (such as in the form of an integral polymeric piece). These resilient surfaces are urged against second surface 30 so as to form a seal.

Figure 4:
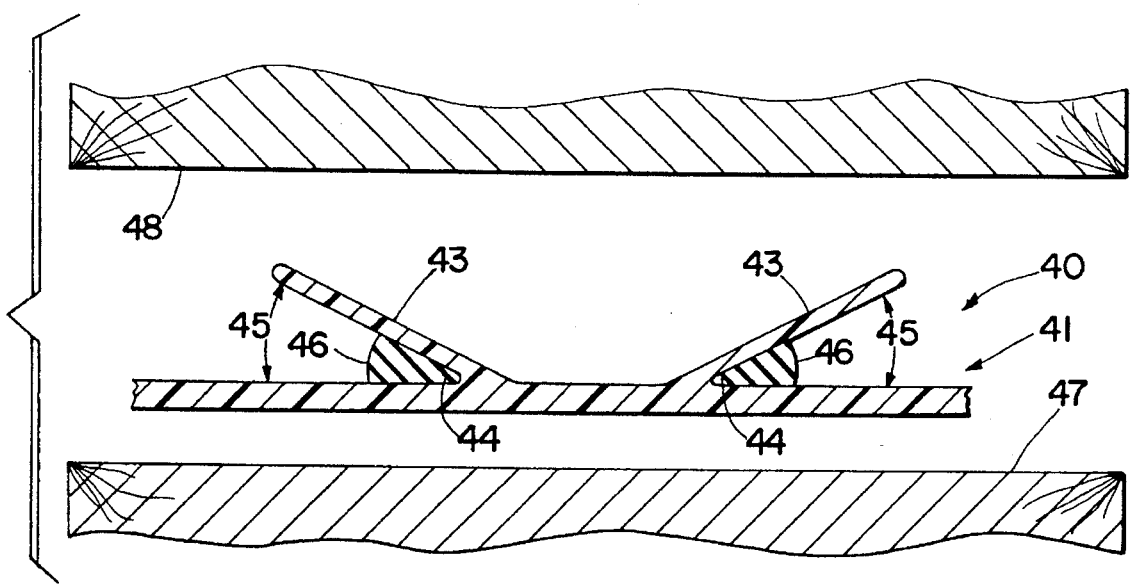
FIG. 4 is a cross-section view of a sealing/spring strip in accordance with a third embodiment type of the present invention.

FIG. 4 shows a cross-section view of a sealing/spring strip prepared in accordance with a third embodiment type of the present invention. FIG. 4 shows sealing/spring strip 40 which comprises polymeric extrudate 41 having first surface 42. From first surface 42, extend extension portions 43 which form acute angle corners 44 with the first surface 42. The extension portions of 43 are sufficiently flexible so as to be movable from a rest position (the position shown in FIG. 4) to a compressed position relatively closer to the upper surface 42 of the polymeric extrudate 41 (as indicated by directional movement arrows 45). Acute corners 44 are provided with silicone rubber 46 which once cured, serves to resist the movement of extension portions 43 from the rest position to the compressed position.

In order to produce a sealing/spring strip in accordance with this embodiment of the invention, it is preferred that the extrudate be oriented as is shown in FIG. 4 so that the silicone rubber 46 can be laterally injected into the respective acute angle corners 44. It will also be appreciated that this embodiment type of the present invention can be executed using only one such extension portion 43 as part of a polymeric extrudate such as 41. In such cases it may be desirable to orient the extrudate such that the single acute angle corner 44 so produced is oriented so as to open upwardly to better retain the uncured silicone rubber in the acute angle corner.

Sealing/spring strip 40 may be affixed to a first surface 47 by any mechanical means such as those mentioned above. The affixed sealing/spring strip may then be brought in contact with second surface 48 so that second surface 48 comes in contact with extension portions 43, forcing them towards a compressed position along directional movement arrows 45 as described above. Alternatively and preferably, the sealing/spring strip 40 may be integrally incorporated into the balance of the structure represented by first surface 47 (such as in the form of an integral polymeric piece). The resilience of silicone rubber bead 46 causes a seal to be formed between the second surface 48 and the extension portions 43 of the sealing/spring strip 40.

Figure 8:
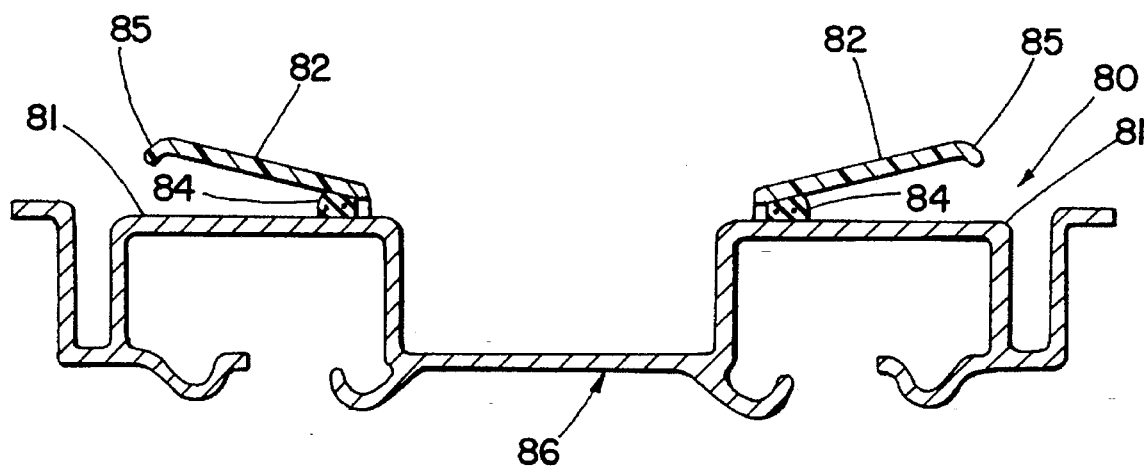
FIG. 8 is a cross-section view of a sealing/spring strip in accordance with a third embodiment type of the present invention, and featuring a profile adapting the strip for use in a dual pane window assembly.

FIG. 8 is a cross-section view of the sealing/spring strip in accordance with the third embodiment type of the present invention, and featuring a profile adapting the strip for use in a dual pane window assembly as described with respect to FIGS. 6 and 7 above. FIG. 8 shows base portion shows jamb liner 80 which incorporates base portions 81, each provided with extension portions 82, forming acute angles 83, and adapted to hold silicone rubber bead 84. Extension portions 82 may preferably be provided with an inwardly curved edge 85 which allows it to ride more easily against the surface it contacts as may be appreciated from the environmental view of FIG. 10 herein for the embodiment of FIG. 9. The balance of the jamb liner structure 86 is formed so as to be amenable to its use as a jamb liner; that is, to engage a dual pane window assembly in accordance with profiles and arrangements known in the art as exemplified in FIG. 10 herein.

FIG. 9 is a cross-section view of a preferred embodiment of the third embodiment type of the present invention, which is presently considered to be the best mode of practicing the invention when used in a window jamb liner. FIG. 9 is shown as approximately 5 times actual size. FIG. 9 shows base portion shows jamb liner portion 90 which comprises base portions 91, each provided with extension portion 92, forming acute angle 93, and adapted to hold silicone rubber bead 94. Extension member 92 may preferably be provided with an inwardly curved edge 98 which allows it to ride more easily against the surface it contacts as may be appreciated from FIG. 10 herein. Extension member 92 preferably may also be provided with extension member 95 which extends toward the interior of the acute angle so formed (i.e. toward the first surface of the base portion 91) so as to provide additional mechanical support for the uncured silicone rubber bead once placed in the of the acute angle, and to provide physical support and alignment for the cured silicone bead 94. Likewise, base portion 91 preferably may also be provided with extension member 96 which extends toward the interior of the acute angle so formed (i.e. toward the first surface of the base portion 91) so as to provide additional mechanical support for the uncured silicone rubber bead once placed in the of the acute angle, and to provide physical support and alignment for the cured silicone bead 94. As mentioned above, the acute angle preferably may be formed by the coextrusion of two polymer of differing physical characteristics. FIG. 9 shows that extension member 92 and base member 91 is formed from a polymer having a higher impact rating than that used to form the acute corner itself (leg portion 97), so that the extension portion does not bend under a load while the leg portion 97 flexes. This construction helps to prevent the polymer in the extension portion(s) from fatiguing over several flexing cycles and from having a shape memory imparted to them. Examples of a combination of polymeric materials which may be used for the base and extension portion(s), and for the acute angle portion(s) are, respectively high impact PVC formulation 85857 and flexible PVC formulation 83741, both commercially available from B.F. Goodrich Chemicals of Akron, Ohio.

The dimensions of the jamb liner portion, though not a limitation to the invention are, for the embodiment shown in FIG. 9, as follows: the extension portion 92 and base portion 91 have a thickness of about 0.060 inches; the thickness of the leg portion 97 is about 0.030 inches; the diameter of the silicone bead 94 may be in the range of about 0.094 inches to 0.140 inches; and the thickness of the smaller extension members 95 and 96 is about 0.020 inches.

The jamb liner portion may be incorporated into a jamb liner structure as is shown in FIG. 10. Alternatively and preferably, the jamb liner portion may be integrally incorporated into a jamb liner by extruding the structure as a single piece as shown, for instance, in FIG. 8 where the base portion and the balance of the jamb liner are extruded as a single structure.

FIG. 10 shows a cross-section of a window frame construction 100 containing a jamb liner prepared in accordance with the present invention. FIG. 10 shows wooden window frame 101 having groove 102. The jamb liner 103 is formed from a conventional jamb liner which is adapted to grip groove 102 as shown in a window frame. The window frame also has trim facia piece 105. Where normally a urethane foam would be placed in groove 102, jamb liner portion(s) 90 is disposed so as to provide a spring-like member to urge the jamb liner 103 against the abutting tongues 104 of wooden frame 101. The base portion of the jamb liner portion may be adhered or otherwise attached to the inside of the jamb liner 103 as shown, such as with two-sided adhesive tape. The extension portions (item 92 in FIG. 9) face the inside of the groove 102. As jamb liners such as 103 are readily commercially available, the improved jamb liner portion of the present invention may be assembled in this way by adhering the base portion to the inside of the stock jamb liner as Shown in FIG. 10. However, because it involves less labor intensive steps (and is therefore relatively more economical) to form the inventive jamb liner as a single piece as described in FIG. 8, this method is preferred over extruding the assembly in individual pieces as shown in FIG. 10. Accordingly, the embodiment of FIG. 10 is presently considered to represent the best mode of the invention for the production of jamb liners with the exception that the improved jamb liner be formed as a single piece as shown in FIG. 8.

Figure 5:
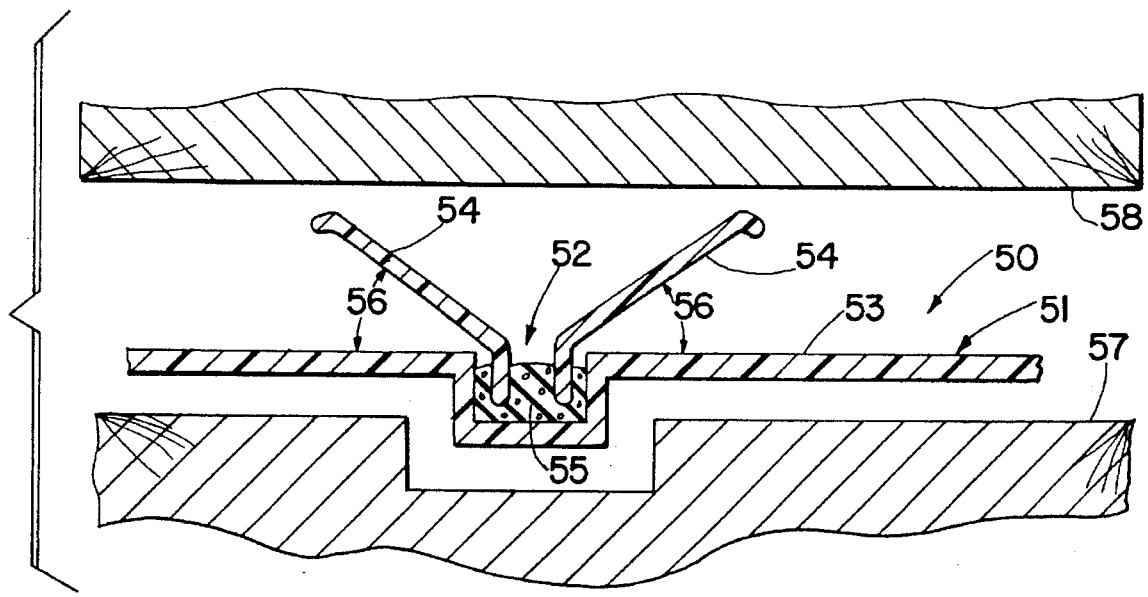
FIG. 5 is a cross-section view of a sealing/spring strip in accordance with a fourth embodiment type of the present invention.

Turning to FIG. 5, this figure shows yet another variation of the present invention in accordance with a fourth embodiment type thereof.

FIG. 5 shows a sealing/spring strip 50 which comprises a polymeric extrudate 51 which forms well 52. Polymeric extrudate 51 has first surface 53. Two extension portions 54 are provided which both extend into well 52 and extend above surface 53. Well 52 is filled with silicone rubber 55 such that extension portions 54 extend into the silicone rubber 55, and are held in the positions shown in FIG. 5.

Extension portions 54 may be separately extruded and oriented in position in either before or after the silicone rubber 55 is placed in well 52. Once cured, the silicone rubber not only holds the position of extension portions 54 shown in FIG. 5 (the so-called rest position) but also resists their movement into a compressed position closer to the upper surface 53 along directional movement arrows 56.

Sealing/spring strip 50 may be applied to form a seal between first surface 57 and second surface 58. The polymeric extrudate 51 is attached to first surface 57 by any of the mechanical means mentioned above or their equivalent. Here it is noted that first surface 57 may be contoured so as to accommodate the size of well 52. Another embodiment may be to thicken extrudate 51 so that the thickness of the portions not forming well 52 is equal to the thickness dimensions of those portions forming the well. This would allow application of the sealing/spring strip 50 to a flat surface. Once fixed to a surface 57, the sealing/spring strip is brought into contact with surface 58 by urging surface 58 against extension portions 54. Alternatively and preferably, the sealing/spring strip 50 may be integrally incorporated into the balance of the structure represented by first surface 57 (such as in the form of an integral polymeric piece). Movement of surface 58 against extension portions 54 causes these extensions to move along directional movement arrows 56 from the rest position to the compressed position closer to surface 53. The resilience of the silicone rubber 55 resists this movement causing a seal between the two surfaces to be formed.

The sealing/spring strip may be made with one extension portion with an inner surface facing the first (i.e., upper) surface 53 of the base portion and an outer surface facing away from the first surface of the base portion, and at least one extension portion 54 which comprises an inner end connected to, the first surface 53 of the base portion and an outer end opposite the inner end. The outer end may be shaped so as to contain a bend directing the outer end toward the first surface 53 of the base portion whereby the outer surface is convex, as can be appreciated from FIG. 5.

It will also be appreciated that this embodiment of the present invention may also be executed using only a single extension 54.

In order to produce sealing/spring strips in accordance with the present invention, it will normally be the case that such sealing/spring strips can be most efficiently produced by polymeric extrusion to produce the polymeric extrudate portions of the present invention as outlined above. Such extrudates may be produced using any conventional extruder apparatus. Examples of such apparatus include extruder model CM-80 OR CM-111, commercially available from Cincinnati Milacron Company of Cincinnati, Ohio.

The polymeric materials used to make the polymeric extrudates for the present invention may be of any suitable polymeric material depending on the desired application. Such materials include polyvinylchloride (PVC), chloropolyvinylchloride (CPVC), with or without polyvinylidinefluorides and/or acrylics, or alloys of any of the aforesaid. Of these materials, where a high impact weatherable PVC is to be used in accordance with the present invention, B.F. Goodrich formulation 85857 in cube form is preferred. Where the high impact PVC is to be coextruded with a flexible PVC, a preferred flexible PVC is B.F. Goodrich formulation 83741 in cube form.

The silicone rubber which may be used in accordance with the present invention may be of any commercially available type, again depending on the desired application and the dictates of economics. An example of commercially available silicone rubber is Nuva-Sil 83 commercially available from Loctite Corporation of Newington, Conn. Although not a limitation., the silicone rubber may be foamed with nitrogen to an extent such as 40% to 50% of the total volume, with 50% being preferred. Although not limited to any particular dimension of the silicone rubber bead, a typical thickness for the silicone bead is about 0.100 inches in diameter (measured from the upper surface of the base portion of the extrudate). The silicone rubber may be injected onto the extrudate using an injector such as The Foamix System Model, commercially available from Nordson Company of Cleveland, Ohio. This device uses an impeller which creates bubbles in the silicone rubber as it passes into a cavity having a nitrogen atmosphere.

The silicone rubber may be cured in accordance with manufacturer's specifications. For instance, with an extrude speed of about 60 feet per minute (or one foot per second) and assuming a light intensity of 100 mw/cm$^2$ at a distance of six inches from the light source and requiring a total power output of 1.5 joules, the amount of light necessary can be calculated.

Using the formula: T= Joules/Light Intensity 1.5 W—sec/sm$^2$/0.1 W/sm$^2$ (or 100 mw/sm$^2$)=15 seconds. With the exposure time in hand, this is multiplied by the extrudate speed to obtain the light exposure length in inches:

15 seconds×60 ft/min/60 sec/min=15 feet Using six inch UV light bulbs, this would require 30 UV light sources to provide the necessary power output.

An alternative light source such as fusion light could provide more light intensity, thus decreasing the amount of bulb necessary to cure the silicone rubber.

The finished extrudate product may be cut to a desired length such as through the use of Teflon®-coated blades.

The polymeric material(s) and the type of silicone rubber used to execute the present invention are not critical limitations of the present invention.

In view of the foregoing disclosure, it will be within the ability of one or ordinary skill in the relevant art to make variations, alterations, and modifications, including the substitution of equivalent materials, variations in geometry, or the integration or disintegration of parts, to execute the present invention without departing from its spirit as reflected in the appended claims.

What is claimed is:

1. A sealing/spring strip, said sealing/spring strip comprising:
   a longitudinally extending polymer and silicone rubber composite strip, said strip having a cross-section, said cross-section comprising:
   (i) a base portion having first and second sides providing respective first and second surfaces, and having a longitudinally extending well formed in said first side; and
   (ii) at least one extension portion partially disposed in said well and extending at an angle from said first surface, said at least one extension portion held resiliently in place by silicone rubber in said well, said at least one extension being movable between a rest position relatively further from said first surface and a compressed position relatively closer to said first surface, said cured silicone rubber resisting the movement of said extension from said rest position to said compressed position.

2. A sealing/spring strip according to claim 1 wherein said angle is in the range of 1 to 60 degrees.

3. A sealing/spring strip according to claim 1 comprising two said extension portions extending at opposing angles from said first surface, said extensions each being movable between a rest position relatively further from said base portion and a compressed position relatively closer to said base portion, said cured silicone rubber resisting the movement of said extensions from said rest position to said compressed position.

4. A sealing/spring strip according to claim 1 wherein said at least one extension portion comprises an inner surface facing said first surface of said base portion and an outer surface facing away from said first surface of said base portion, and said at least one extension portion comprise an inner end connected to said first surface of said base portion and an outer end opposite said inner end, said outer end having a bend directing said outer end toward said first surface of said base portion, whereby said outer surface is rendered convex.

5. A sealing/spring strip according to claim 1 wherein said polymer is a foamed polymer.

6. A sealing/spring strip according to claim 1 wherein said silicone rubber contains bubbles of gas.

* * * * *